United States Patent [19]
Lai

[11] Patent Number: 5,968,644
[45] Date of Patent: Oct. 19, 1999

[54] MOUSE DEVICE PAD

[76] Inventor: Jung-Tsu Lai, 3F,No.120,TSYR Huey 1 St., Chung-Li, Taoyuan, Taiwan

[21] Appl. No.: 09/203,310

[22] Filed: Dec. 2, 1998

[51] Int. Cl.$^6$ ............................................... B31B 1/78
[52] U.S. Cl. ..................... 428/317.1; 428/137; 428/304.4
[58] Field of Search .............................. 428/317.1, 304.4, 428/137

[56] References Cited

U.S. PATENT DOCUMENTS

| | | | |
|---|---|---|---|
| 4,799,054 | 1/1989 | House | 340/710 |
| 5,022,170 | 6/1991 | House | 40/358 |
| 5,217,781 | 6/1993 | Kuipers | 428/85 |
| 5,219,649 | 6/1993 | Nishino et al. | 428/317.7 |
| 5,340,075 | 8/1994 | Schriner | 248/346 |
| 5,508,084 | 4/1996 | Reeves et al. | 428/172 |
| 5,556,061 | 9/1996 | Dickie | 248/51 |
| 5,788,203 | 8/1998 | Nitti | 248/346.01 |
| 5,791,620 | 8/1998 | Carcich, Jr. | 248/346.01 |
| 5,820,968 | 10/1998 | Kurani | 428/137 |

Primary Examiner—Marion McCamish
Assistant Examiner—Arti R. Singh
Attorney, Agent, or Firm—Rosenberg, Klein & Bilker

[57] ABSTRACT

The invention herein relates to a kind of improved mouse device pad, specifically referring to kind improved mouse device pad that is constructed of knitted fabric and polyvinyl chloride (PVC) compound foam, with the innovations of the invention herein including the utilization of an appropriate quantity of softener and adhesive agents as additives during the fabrication process of the PVC compound foam, which enables after fabrication pliancy and greater surface contact stiction because the aforesaid mouse pad is of a thin profile and remains extremely pliant even after the knitted fabric is glued onto the top. Furthermore, when the PVC compound foam bottom layered and knitted cloth surface layered improved mouse pad of the invention herein is utilized for desktop mouse device operation, in addition to the greater surface stiction provided by the PVC compound foam, the aforesaid mouse pad is not only effectively prevented from sliding randomly out of position, but also remains completely flat against the desktop, enabling a larger mouse device operating surface area and thereby providing improved operating convenience and ease.

1 Claim, 2 Drawing Sheets

MOUSE DEVICE PAD

BACKGROUND OF THE INVENTION

As the platform for the mouse device peripherals that control cursor movements on computer screens, mouse device pads are virtually indispensable for computer operation and are currently in widespread utilization. As indicated in FIG. 2, the general configuration mainly consists of a foam body (1) of a certain hardness that is approximately 3 mm thick, with a covering of plastic or cloth (2) glued to the top surface of the foam body (1) for manually moving the mouse device. Undeniably, such types of conventional mouse pads effectively allow for convenient and trouble-free mouse device movement on flat and uncluttered computer desktops. However, the inventor of the invention herein is aware that in addition to the main system, the video display unit, keyboard, and the printer, there are also documents, materials, books, writing implements, and other miscellaneous objects on the desktop. Since the remaining space may not be wide enough to accommodate the placement of an entire mouse device pad and, furthermore, the foam body (1) of the aforesaid mouse device pad has a certain degree of hardness, an item such as the miscellaneous object (A) on the desktop often ends up under an end or other area of the mouse device pad such that the whole mouse device pad cannot lie completely flat against the desk surface and one end is folded up, leaving a space underneath (as depicted in FIG. 1). Under such circumstances, the major shortcoming will be the loss of smooth and accurate mouse device (B) operation, especially since the space under the folded section reduces the effective surface area required for mouse device (B) operation, with the direct hindrance to operation posing a major inconvenience. Furthermore, while the application of force onto the mouse device by the user can serve as a means of keeping the mouse device pad in place on the surface of the desk, the excessive friction produced is problematic in that operations accuracy is no longer possible.

Therefore, in order to correct the aforementioned shortcomings and, furthermore, introduce effective improvements so that the utilization of the aforesaid mouse device pad is more ideal and progressive in operation, the inventor of the invention herein conducted extensive research and development based on scientific theories to improve the design of the conventional product, which finally culminated in the invention herein.

SUMMARY OF THE INVENTION

The primary objective of the invention herein is to provide a kind of improved mouse device pad, wherein the bottom layer of the aforesaid mouse device pad is constructed of a thin body of polyvinyl chloride (PVC) compound foam that is pliant and has a certain degree of adhesiveness, with a knitted fabric having similar soft and flexible properties glued onto the top of the aforesaid PVC layer, such that when the aforesaid mouse device pad is placed on the surface of desk for mouse device operation, the PVC compound foam of the aforesaid bottom layer is not only capable of providing greater stiction to prevent the random sliding out of position, but also remains completely flat against the desktop, enabling a larger mouse device operating surface area and thereby, improved operating convenience and ease.

Another objective of the invention herein is to provide a kind of improved mouse device pad, wherein both the PVC compound foam of the bottom layer as well as the knitted fabric of the top layer have pliant characteristics, such that the placement and storage of the aforesaid mouse device pad does not involve an inordinate amount of space.

Yet another objective of the invention herein is to provide a kind of improved mouse device pad that is simple to utilize and store for purposes of convenience and, furthermore, requires minimal space so that the mouse device pad remains in place as positioned and effectively provides a larger surface area for mouse device operations which facilitates operational ease and offers genuine practicality, advanced features, and progressiveness. Furthermore, such an improved mouse device pad of the invention herein has never been introduced.

To allow a further understanding of the major advantages and innovations of the invention herein, the brief description of the drawings of the embodiments below is followed by the detailed description of the invention herein.

DETAILED DESCRIPTION OF THE INVENTION

Figure 1:
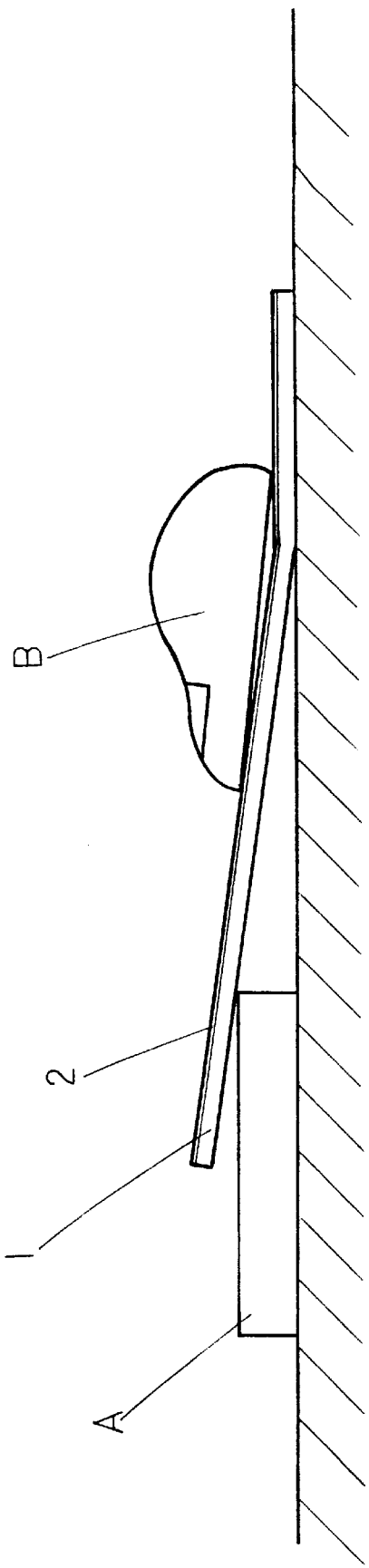
FIG. 1 is an orthographic drawing of a conventional mouse pad that illustrates an operations situation.
Figure 2:
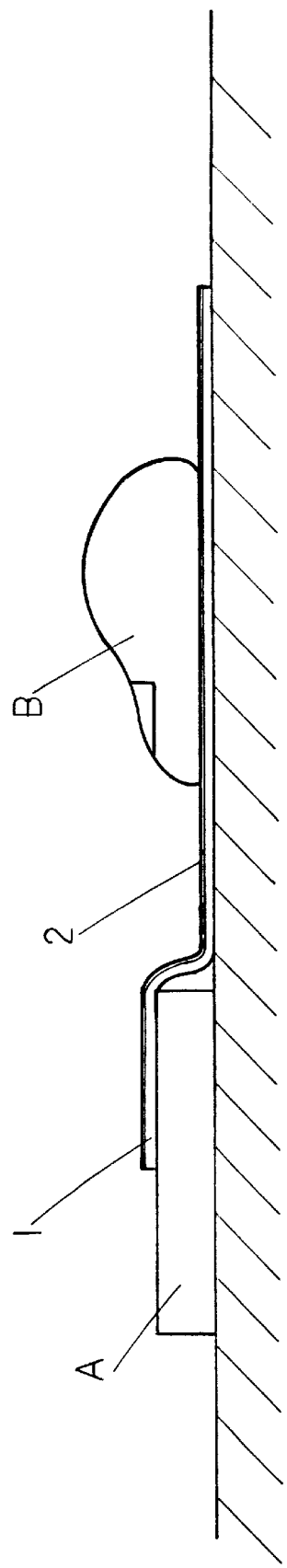
FIG. 2 is an orthographic drawing of the mouse pad of the invention herein that illustrates an operations situation.

Referring to FIG. 2, the improved mouse device pad of the invention herein is mainly comprised of a bottom layer (1) and a surface layer (2) constructed of polyvinyl chloride (PVC) compound foam and knitted fabric, respectively, of which the PVC compound foam bottom layer (2) is extremely thin (0.8 mm approximately) and, furthermore, contains a softener agent and adhesive agent added during fabrication to enable greater overall pliancy as well as increased desktop surface contact after the knitted fabric is glued to the soft bottom layer (1).

During the utilization of the aforesaid mouse device pad structure, there are superior positioning and tracking properties as a result the softer overall texture and, when placed on a desktop and a rising fold is produced at the end or other section due to an item occupying the same surface thereof such as the object (A), the unaffected larger area over the desktop remains completely flat and in position and, furthermore, will not become totally irregular in contour as is typically the case with conventional products and, as such, in actual application, the invention herein significantly expands the mouse device (B) operating surface area, which effectively yields easier and more accurate mouse device (B) operation. Furthermore, since the aforesaid PVC compound foam bottom layer (1) has adhesive properties that directly increase the degree of surface contact, the aforesaid mouse pad remains held fast onto the desktop and, furthermore, the increased stiction effectively provides stationary positioning that facilitates more efficient mouse device operation. Furthermore, since the mouse pad of the invention herein is pliant, carrying, storage, and cleaning does not involve an inordinate amount of space, and are simple and convenient.

What is claimed is:

1. A mouse pad comprising:

a bottom layer formed of a polyvinyl chloride foam compound and having a thickness approximating 0.8 mm, said compound containing a softening agent to increase pliancy of said pad and an adhesive agent to increase displacement resistance of said pad on a support surface; and, a knitted fabric layer adhered to said bottom layer, wherein said mouse pad conforms to a surface contour of the support surface.

* * * * *